Dec. 17, 1946.   A. D. SWENSEN   2,412,638
RUBBER SEALAGING TESTING APPARATUS AND METHOD
Filed Jan. 8, 1945   2 Sheets-Sheet 1
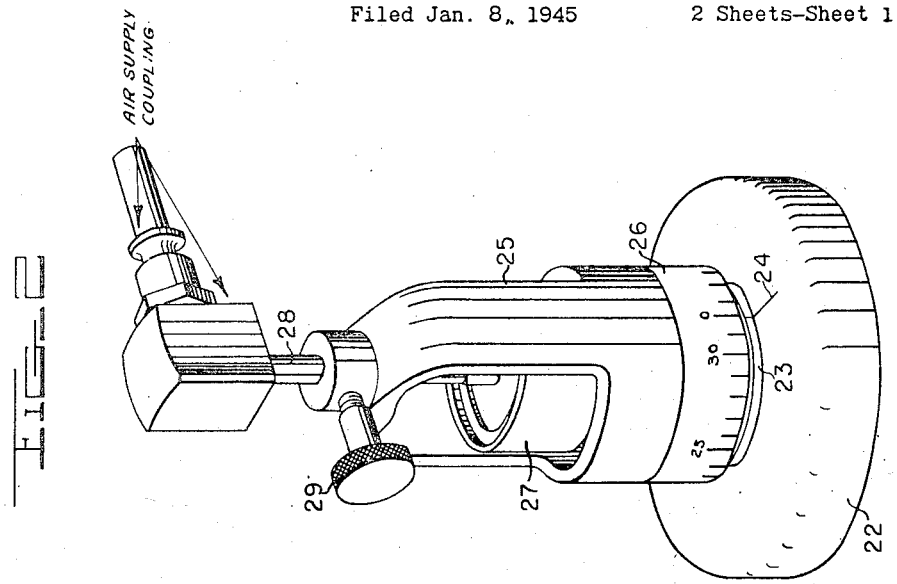
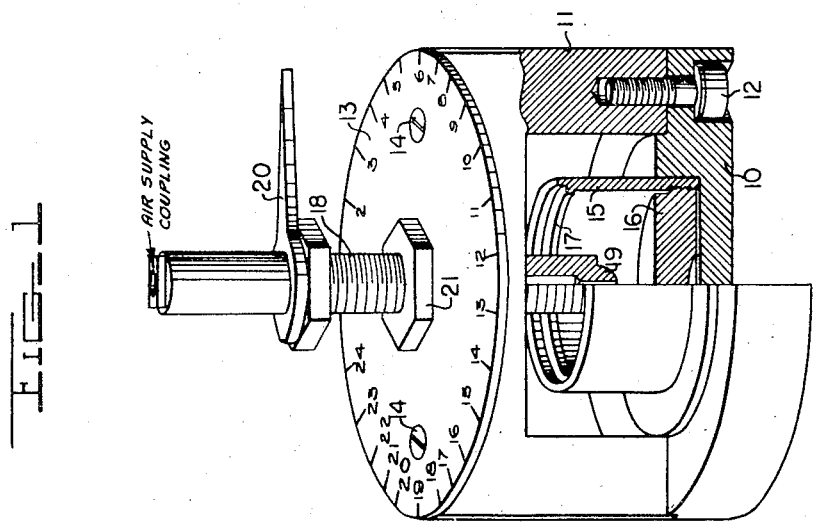
Inventor
ALBERT D. SWENSEN
By  F. E. Bush
     Attorney

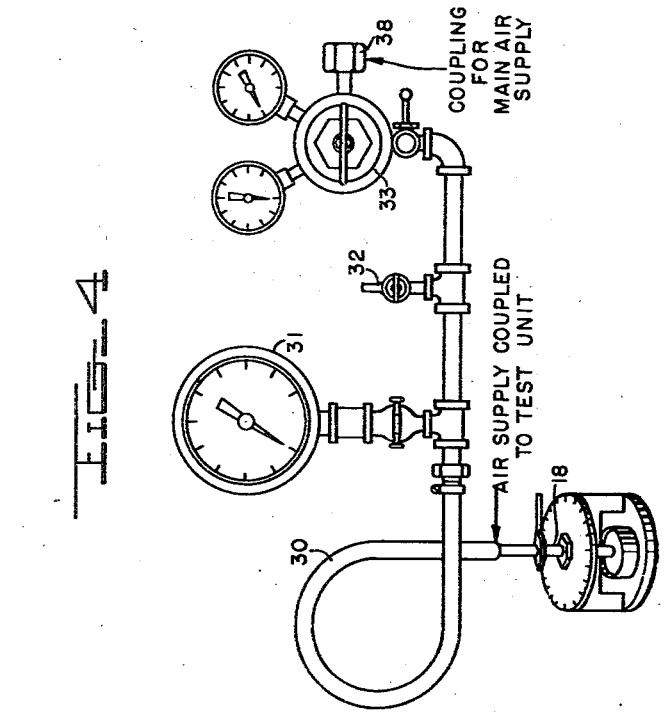
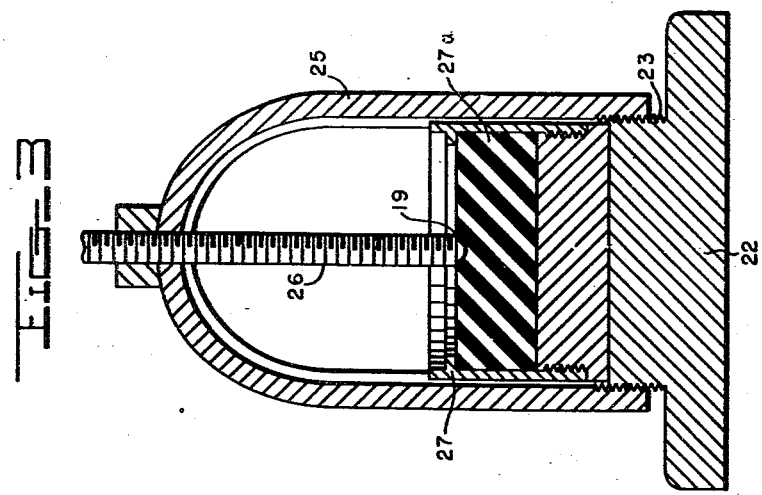

Patented Dec. 17, 1946

2,412,638

UNITED STATES PATENT OFFICE 2,412,638

RUBBER SEAL AGING TESTING APPARATUS AND METHOD

Albert D. Swensen, Washington, D. C.

Application January 8, 1945, Serial No. 571,893

2 Claims. (Cl. 73—37)

(Granted under the act of March 3, 1883, as amended April 30, 1928; 370 O. G. 757)

My invention relates to testing apparatus and a method for testing sealing or gasket material under service-simulating conditions.

In many naval and marine applications a variety of materials such as various natural and synthetic rubbers, are used as gasket materials to line hatches, doors and other openings into compartments, which it is necessary to keep in an air tight or water tight condition. To insure greatest safety the performance characteristics of the gasket materials should be known, for it is just as inconvenient to test the gaskets after they have been put in place as it is to replace them frequently in order to insure maintenance of the water tight or air tight integrity of the compartment. Common plasticity and stability tests are unsatisfactory either because they are too time consuming or because they fail to test for the essential properties required of good gasket materials.

A good gasket material is critically sensitive essentially to at least two factors, namely, its hardness or resistance to deformation and its sensitivity to aging. A good gasket material should possess moderate hardness or should yield under pressure in order to permit some compression of the material by the faces between which it is to act as a seal. It should be very resistant to oxidation or deterioration with age, particularly in view of the applications intended.

It is the primary object of my invention to provide apparatus and a service simulating testing method by means of which the sealing quality of a good gasket material and its susceptibility to deterioration with age can be quickly and accurately determined.

It is a second object of my invention to provide simple, inexpensive apparatus so that the test or tests can be carried out quickly on a number of the specimens.

It is a third object of my invention to provide apparatus which will test gasket materials accurately and specifically for the essential properties required of good gasket material.

Further objects and advantages of my invention will in part be obvious and in part appear hereinafter.

Accordingly my invention comprises the gasket material testing apparatus and method which apparatus involves the features of construction, combinations of elements, and arrangement of parts, which will be exemplified in the construction hereinafter set forth, and the method involving the separate steps and relationship of said steps to one another as will be described, and the scope of the invention will be indicated in the claims.

For a better understanding of the nature, objects and scope of my invention, reference should be had to the drawings accompanying this specification and the following specification in which the structure and method of using the apparatus are set forth in detail. Referring to the drawings, Figure 1 is a perspective view, partially in section, of one embodiment of the gasket material testing apparatus of my invention;

Figure 2 is a perspective view of a second embodiment of my invention;

Figure 3 is a sectional view of the embodiment of the apparatus shown in Figure 2 and taken vertically through the apparatus shown in Figure 2;

Figure 4 is a drawing showing the method of using my apparatus to test gasket materials for their sealing properties.

Referring to Figure 1, 10 represents a base held to a support 11 by means of a screw 12. Thirteen (13) is a calibrated scale, the exact nature and function of which will be explained hereinafter, held to support 11 by means of screws 14; base 10 is recessed to receive therein a specimen holder comprising cylindrical wall 15 and base 16.

The wall 15 of the specimen holder has near its upper edge an inwardly projecting lip 17. Centrally over the specimen holder there is a threaded hole in the top member 13, which hole is adapted to receive threaded member 18. Member 18 is tubular in form and at its lower end is rounded off to form a ball indentor 19. Member 18 also carries an indicator 20 and a lock nut 21. The upper end of the tubular member 18 is adapted to receive or be coupled to a compressed air or fluid supply. Since such connections can be of a variety of forms no specific one has been shown in this figure.

In Figure 2 I have shown a second embodiment of my invention, which possesses elements of the embodiment shown in Figure 1. In Figure 2 twenty-two (22) represents a base member having thereon a male threaded member 23, and also carrying, at any convenient point on the circumference of said member 23, an index line 24. A canopy 25 is internally threaded and adapted to fit onto the threaded member 23. Around the lower circumference of canopy 25 there is a scale 26, which is the equivalent of the scale carried by member 13, shown in Figure 1. The canopy member 25 is adapted to fit over a specimen holder 27, in substantially the same manner in which the support 11 fitted over the specimen holder in Figure 1. The specimen holder it is contemplated to use in both embodiments is the same. The upper end of the canopy is adapted to pass a tubular member 28, which has provisions for being connected to a fluid or compressed air supply, as is indicated roughly in the figure. The member 28 can be locked in any position by lock screw 29.

Figure 3 is a longitudinal sectional view of the embodiment of the apparatus shown in Figure 2 and includes a showing of a sample 27a in place for test.

The apparatus of Figures 1 and 2 can be modified in various details as the two modifications shown indicate. Essentially it is necessary to provide for causing member 18 to indent a material a given amount. In a third form of the apparatus member 18 was keyed to prevent its rotation and its vertical movement accomplished by means of a drive nut like lock nut 21 of Figure 1.

In Figure 4, I have shown the apparatus in place as it is used in testing the sealing quality of a gasket material. In this figure the parts of the apparatus shown in detail in Figure 1 have been indicated and are readily identifiable. A compressed air line 30 is attached to the open end of member 18, which was shown in Figure 1, and in the line there is pressure gage 31, petcock 32, and reducing valve 33. Connections to an oxygen or air supply are made through line 38, and are not shown inasmuch as they are conventional.

Having now described in some detail the structure of my testing unit and also having shown how it is used in a test assembly, I shall now describe the exact method of carrying out an aging test according to the principles elaborated above.

The test specimen, cylindrical in form, is cut from the material to be tested and is made of a size which will fit closely in to the specimen holder of the apparatus described in either Figure 1 or 2. In practice, I have found that it is convenient to use a cylindrical specimen having an area of one square inch, which means its diameter should be 1.129 inches. It have found it convenient, also, to cut the specimen with a die made for the purpose. Any desired lubricating fluid which will not attack the material being tested, such as a soapy solution can be used during the cutting. It is desirable that the specimen have relatively smooth edges so that it will fit the specimen holder closely, and also so that it can be locked securely in the holder without deformation. After preparation of the sample it is inserted into the sample holder so that its upper face contacts the lip 17 shown in Figure 1, and it is then locked in place by assembling the specimen holder.

Having prepared and mounted a specimen in the holder the assembly is placed in the apparatus and the tubular member 18 is lowered until the ball point 19 just makes contact with the upper surface of the specimen, as is shown in Figure 4. When the surface of the specimen has been found, the plunger is carried or forced into the specimen for a desired amount of indentation, for example about $\frac{1}{32}$ of an inch. Since the threads on tubular member 18 can be calibrated with relation to the scale on plate 13 the indicator 20 can be used to determine just exactly how far the ball point is forced into the specimen. I have found it convenient to use a pitch of thread on tubular member 18 of 0.025 inch. Accordingly, in Figure 1 each scale division therefore represents 0.001 inch. This thread pitch is an arbitrary matter and can be varied to suit the convenience of the operator. Having indented the specimen the desired amount, tubular member 18 is locked in place by means of the lock nut 21. Connection is then made to a compressed air supply by coupling member 18 to a line through a reducing valve arrangement as indicated in Figure 3. For the purpose of detecting leakage when it starts following the application of air pressure thereto, enough water or other liquid is added to the specimen container 15—16 to submerge the specimen surface and the nozzle 19 indenting it in order that leakage of the seal formed by the indentation of the nozzle will be revealed by escape of air through the liquid. The pressure at which air bubbles are seen to escape through the surface of the water in the specimen holder is the point at which the sealing material will begin to leak and is designated the unaged sealing pressure.

Determination of the aged sealing pressure is readily made in accelerated form by disconnecting the unit from the compressed air supply, placing it in an oven and maintaining it in the oven at an elevated temperature for a period of about 48 hours and then removing and repeating the test. A different value of the pressure at which leakage occur will be found after aging the material. The difference between the unaged and the aged sealing pressure is a good quantitative indication of the sealing quality of the material tested.

The method of performing the sealing tests on gasket materials using the apparatus described in Figure 2 is substantially identical with that described in conjunction with the apparatus shown in Figure 1. The only material difference lies in the fact that the scale by which the amount of indentation by the tubular member is determined is mounted on the canopy in Figure 2. The specimen is held in place and the indentation is actually measured by turning the base 22 of the apparatus upward a given amount. That is, in performing the test, the specimen is put in place, tubular member 28 is lowered to contact the upper surface of the test specimen, it is locked in place, and then the required amount of indentation is made by turning the base up the given amount. The amount by which the base is turned up is gaged by means of the scale 26 and index mark 24. The remainder of the procedure in carrying out the test is identical with that described in conjunction with Figure 1.

Since certain changes may be made in the above construction and different embodiments of the invention could be made without departing from the scope thereof, it is intended that all matter contained in the above description or shown in the accompanying drawings shall be interpreted as illustrative and not in a limiting sense. It is also to be understood that the following claims are intended to cover all of the generic and specific features of the invention herein described and all statements of the scope of the invention which, as a matter of language, might be said to fall therebetween.

The invention described herein may be manufactured and used by or for the Government of the United States of America for governmental purposes without payment of any royalty thereon or therefor.

Having described my invention what I claim as new and desire to secure by Letters Patent of the United States is:

1. The method of testing gasket materials for their sealing quality, comprising, pressing a nozzle against a specimen to indent the material a given amount thereby to form a chamber sealed by said material, covering the exterior portion of the material outside of said chamber with a liquid, applying gas pressure to the inside of said chamber until leakage occurs, and measuring the pressure at which the leakage occurs as an index of the sealing quality of the material.

2. A compressible gasket material testing unit comprising, a base having therein a cylindrical threaded member to hold a specimen of the material to be tested, a canopy cooperatively threaded to engage said cylindrical member, a tubular penetrator member guided in longitudinal movement and supported by said canopy, locking means to hold said tubular member in fixed position while the specimen is brought into contact therewith and indented thereby, a fluid supply for application of fluid pressure to said specimen through said tubular member, said tubular member and its point of contact with said specimen forming a fluid escape revealing structure.

ALBERT D. SWENSEN.